May 13, 1952 T. E. LYNCH 2,596,494

CERAMIC ELECTROMECHANICAL TRANSDUCER

Filed June 12, 1948 2 SHEETS—SHEET 1

INVENTOR.
THOMAS E. LYNCH
BY Harries A. Mumma, Jr.
ATTORNEY

May 13, 1952 T. E. LYNCH 2,596,494

CERAMIC ELECTROMECHANICAL TRANSDUCER

Filed June 12, 1948 2 SHEETS—SHEET 2

INVENTOR.
THOMAS E. LYNCH
BY Harries A. Mummaph
ATTORNEY

Patented May 13, 1952

2,596,494

UNITED STATES PATENT OFFICE 2,596,494

CERAMIC ELECTROMECHANICAL TRANSDUCER

Thomas E. Lynch, Cleveland, Ohio, assignor to The Brush Development Company, Cleveland, Ohio, a corporation of Ohio Application June 12, 1948, Serial No. 32,617

16 Claims. (Cl. 179—100.41)

Figure 2:
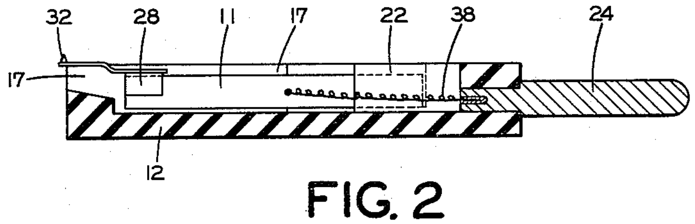

This invention relates to electro-mechanical transducers, and more particularly to such transducers of the type utilizing elements of electro-mechanically sensitive dielectric material. In a specific form, this invention relates to transducers of the type mentioned arranged to operate as phonograph pickup devices.

Numerous electro-mechanical transducers have been devised, many of which are adaptable for use as phonograph pickup devices. Such devices utilizing an electro-mechanically sensitive dielectric element are subject to breakage of or other damage to the element, and at least to some extent they are subject also to impairment or actual breakage of the stylus which is in contact with the record medium during phonographic reproduction. For mounting and covering purposes the electro-mechanically sensitive element and the arrangement for affixing the stylus thereto customarily are placed in a container or cartridge. In view of the likelihood of severe mechanical shocks during operation and of other design considerations, the mounting of the element and the design of the stylus usually are such as to provide a certain degree of resiliency to the entire element, although too much resiliency, especially in the direction of the motion which is associated with the electro-mechanical transducing, impairs the operation of the transducer. As a compromise solution to the mounting problem, the electro-mechanically sensitive elements commonly are supported within the cartridge by clips or pads of various degrees of resiliency or softness. Nevertheless, deterioration and breakage of the element or stylus frequently occur, so that plug-in arrangements facilitating replacement of the cartridge have become standard.

Some of the problems associated with the design of electro-mechanical transducers of the phonograph pickup type may be met by the use of a polycrystalline electro-mechanically sensitive dielectric material such as barium titanate. Transducing elements of titanate material and bending-sensitive composite elements made of plates of the same material are disclosed and claimed in the copending applications Serial Nos. 740,460, now Patent No. 2,592,703, granted April 15, 1952, and 740,461, filed April 9, 1947, in the name of Hans Jaffe and assigned to the same assignee as the present invention, the latter application having issued on October 18, 1949, as Patent No. 2,484,950. A particularly advantageous element of titanate material has the form of a hollow, bending-sensitive tube; transducers utilizing elements of this type are disclosed and claimed in the copending application Serial No. 32,593, filed June 12, 1948, in the name of Alfred L. W. Williams and assigned to the same assignee as the present invention. Electro-mechanically sensitive elements of polycrystalline dielectric material usually withstand operating temperatures at which elements cut from single crystals sustain permanent damage. The titanate elements withstand chemical attack and are not subject to critical variations under unusually dry or humid conditions. Consequently the likelihood is decreased that replacement of the element will become necessary. However, they may be found most useful in thin shapes, in which case the material is rather frangible if subjected to extensive mechanical shocks in certain directions.

It is, therefore, an object of the invention to provide a new and improved electro-mechanical transducer including an electro-mechanically sensitive element free from the above-mentioned limitations and disadvantages of the prior transducers.

It is another object of the invention to provide an electro-mechanical transducer of simplified and inexpensive construction.

It is a further object of the invention to provide a new and improved electro-mechanical transducer of the phonograph pickup type and including an element of electro-mechanically sensitive dielectric material protected from breakage without the use of excessively resilient supports.

It is a still further object of the invention to provide a new and improved electro-mechanical transducer of the phonograph pickup type designed for long service life, so that replacement of the electro-mechanically sensitive portion of the pickup during service is not an important consideration.

In accordance with the invention, an electro-mechanical transducer comprises an elongated element of electro-mechanically sensitive dielectric material and which has an electro-mechanical response involving a bending of longitudinally extending portions of the element during transducing therein between the mechanical energy associated with the bending and electrical energy. The transducer also comprises a base block having, for receiving the longitudinally extending portions of the elongated element, an elongated depressed region including a constricted supporting zone with walls adjacent and rigidly affixed to two opposite sides of one end portion of the elongated element, the element being disposed in spaced relationship to the aforementioned depressed region of the base block except at that one end portion. There are provided mechanical means coupled to the element at the other end portion thereof for translating the mechanical energy and electrode means on the element for translating the electrical energy. The transducer further includes motion-limiting wall members of the depressed region of the base block, remote from the aforesaid one end portion of the element and disposed in the direction of the bending thereof at a distance therefrom such as effectively to limit displacements thereof to protect the dielectric material from breakage.

In accordance with another feature of the invention, a phonograph pickup comprises a similar elongated element. The pickup further includes a tone arm of a shapable material one end portion of which is arranged for pivotal mounting and the other end portion of which has, shaped in the material for receiving the longitudinally extending portions of the element, an elongated depressed region including a constricted supporting zone within which one end portion of the element is affixed. In addition to electrode means, the pickup includes mechanical means coupled to the element at the other, or unsupported, end portion thereof and extending outwardly of the depressed region for translating the mechanical energy transduced during operation.

For a better understanding of the present invention, together with other and further objects thereof, reference is had to the following description taken in connection with the accompanying drawings, and its scope will be pointed out in the appended claims.

Figure 1:
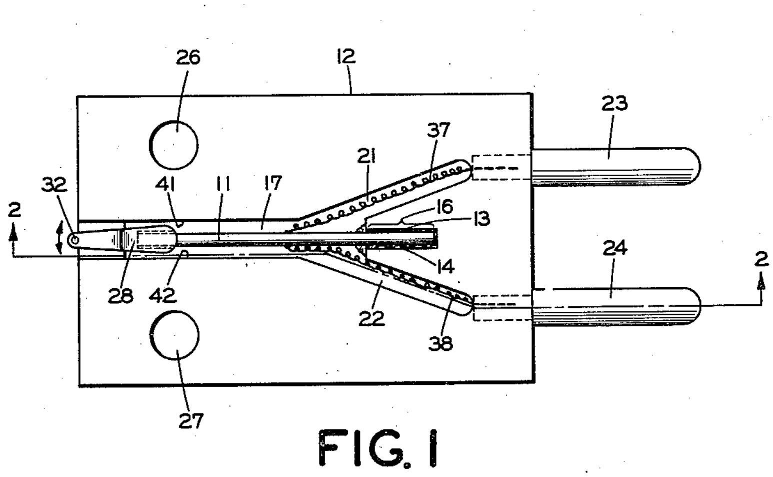
Figures 3, 4:
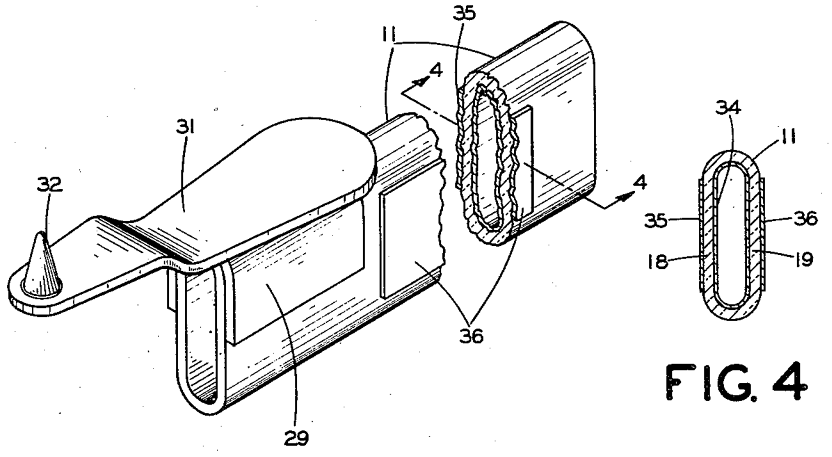
Figures 5, 6, 7, 8:
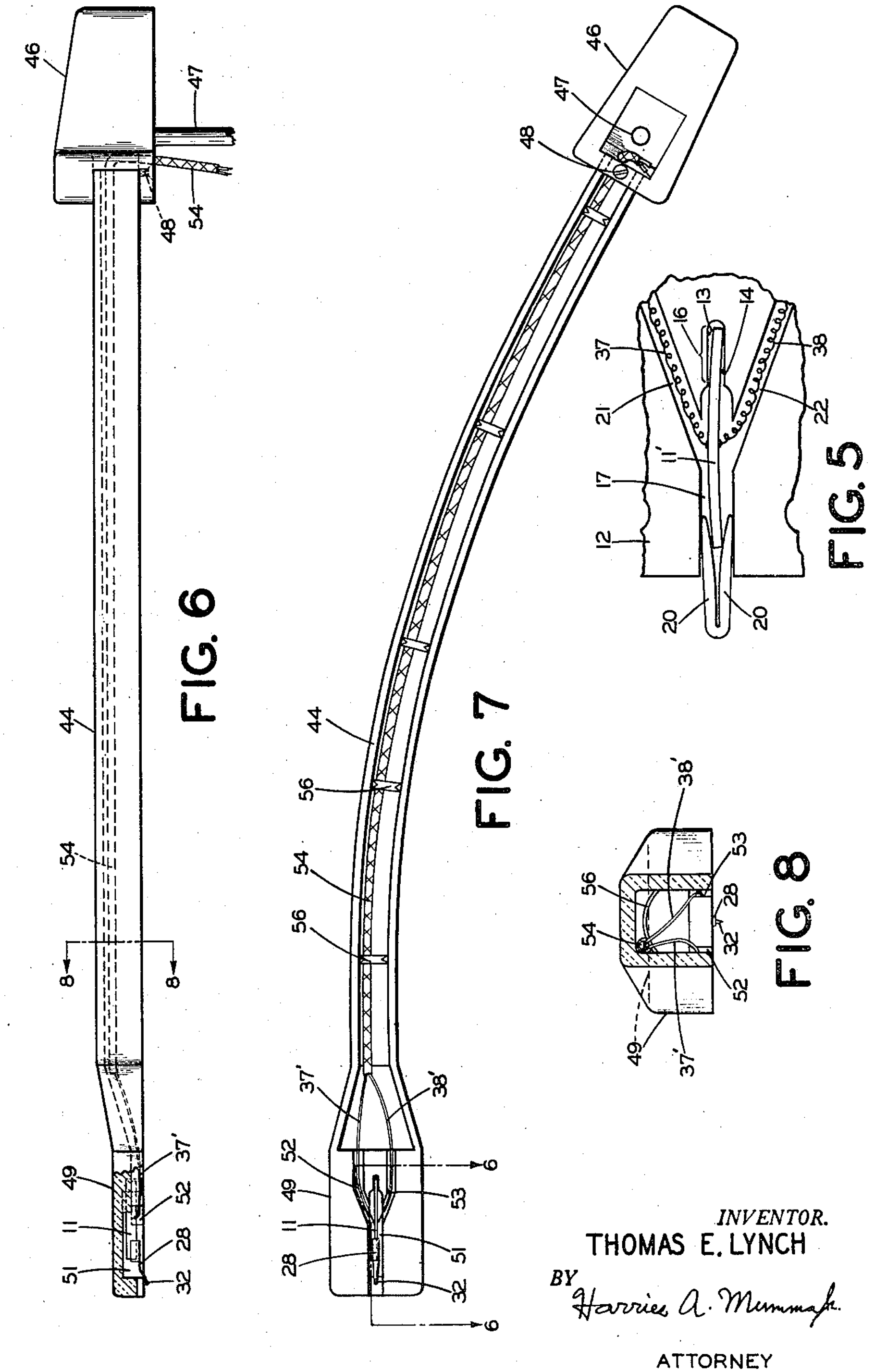

In the drawings, Fig. 1 is a bottom view of an electro-mechanical transducer embodying the present invention; Fig. 2 is a sectional elevation of the transducer of Fig. 1 taken in the direction indicated by the line 2—2 in Fig. 1; Fig. 3 is an enlarged perspective view of the electro-mechanically sensitive element of the transducer of Figs. 1 and 2 with the central portion of the element cut away; Fig. 4 is a cross-sectional view taken in the direction indicated 4—4 in Fig. 3; Fig. 5 is a partial bottom view similar to the view of Fig. 1 but illustrating a transducer including an element having a shape differing somewhat from that of the element illustrated in Figs. 1-4; Figs. 6 and 7 are front and bottom views respectively of a phonograph pickup device embodying the present invention, with a portion of the transducer end of the pickup sectionalized in Fig. 6 along the line indicated 6—6 in Fig. 7; and Fig. 8 is an enlarged cross-sectional view taken in the direction indicated 8—8 in Fig. 6.

Referring to the drawings, Figs. 1 and 2 are bottom and sectional elevation views illustrating an electro-mechanical transducer comprising an elongated element 11 of electro-mechanically sensitive dielectric material and which has an electro-mechanical response involving a bending of longitudinally extending portions of the element during transducing therein between the mechanical energy associated with the bending and electrical energy. A bending-sensitive element of the type described may be formed of two elongated plates cut from single crystals of piezoelectric material. The major surfaces of these plates are electroded and the plates then are affixed to each other at electroded surfaces thereof to form a sandwich-like element. Bending of longitudinally extending portions of this element causes expansion of one of the plates and simultaneous contraction of the other. The two outer electrodes and the common inner electrode of the sandwich element may be connected in a well-known manner to provide a bending-sensitive transducer element.

Alternatively, a bender element utilizing two electroded and affixed slabs of polycrystalline titanate dielectric material, in the manner described and claimed in the aforementioned application of Hans Jaffe, Serial No. 740,461, may serve as the elongated element 11 of the transducer of Figs. 1 and 2. It now is preferred, however, to use an elongated hollow or tubular electro-mechanically sensitive element of a polycrystalline titanate material, such as barium titanate material. Transducer elements of this type are illustrated and their operation described in detail in the aforementioned copending application of Alfred L. W. Williams, Serial No. 32,593. In the preferred embodiment of the present invention there is used a hollow element of thin-walled titanate material and generally elliptical in cross section, so that the element has two relatively flat and wide sides connected by two relatively rounded and narrow sides.

To support the element 11 the transducer includes a base structure in the form of a rather thick base block 12, preferably of non-conductive material and of generally rectangular sectional shape. Any easily machined insulating material is suitable, for example, a fabric impregnated with a phenolic resin. However, for reasons of durability, ease of forming by molding operations, and attractive appearance it is preferred to use one of the clear synthetic polymers such as a polymethyl methacrylate or polystyrene resin. The base block 12 is shaped so as to include as a unitary part thereof two shoulders 13, 14. These shoulders form the walls of a constricted zone 16 at one end of an elongated depressed region or channel 17 formed or cut into the bottom of the base 12. The depressed region or channel 17 is provided for receiving the longitudinally extending portions of the element 11, and the shoulders 13, 14 serve as supports adjacent and rigidly affixed to two opposite sides of one end portion of the elongated element 11. These two opposite sides are the two relatively flat sides of the generally elliptical elongated hollow element, which is shown in greater detail in the perspective view of Fig. 3 and in the cross-sectional view of Fig. 4. In the view of Fig. 4 these two relatively flat sides are designated 18 and 19. The sides 18 and 19 of the element 11 may be affixed to the polystyrene walls of the constricted supporting zone 16 by cementing with one of the cements known to the plastics art for bonding purposes, for example, dissolved polystyrene. When the dissolved resin is applied to the sides of the element 11 and the shoulders 13, 14 in the constricted zone 16, the solvent evaporates and the cementing is accomplished by areas of the same nonconductive material of which the base is made.

The constricted supporting zone 16 advantageously has just sufficient width to permit affixing the end portion of the element 11 therewithin, when the element has a longitudinal configuration which may differ from a predetermined configuration within fixed production run tolerances, with the element disposed in roughly evenly spaced relationship to the walls of the channel 17 except at the end portion of the element in the supporting zone 16 regardless of such variations in longitudinal configuration. To illustrate the method of adjusting and affixing the element within the channel, it may be assumed that the element is ideally of a straight longitudinal configuration, as illustrated in Fig. 3. Titanate elements of the type there illustrated are subjected to a ceramic-firing operation, and during this or other forming operations the element may become bent to some extent without substantially impairing its electromechanical characteristics. Such a slightly bent element 11', mounted in the base structure 12, is illustrated in the partial plan view of Fig. 5 with the yoke structure 28, referred to hereinbelow, omitted from the view. Preparatory to cementing the bent element to the base 12, it is disposed in the channel 17 so that it is roughly centered laterally within the channel with approximately equal clearances between the walls of the channel 17 and the portions of each side 18 and 19 at the free end of the element. This centering may be accomplished by the use of jigs 20, 20, as shown in Fig. 5. This results in the sides 18 and 19 at the supported end portion of the element being aligned approximately contiguous to the walls 13, 14 of the supporting zone 16 but with an angular relationship thereto such that the element is centered approximately in the channel in spite of the production run differences from the predetermined configuration. This uncomplicated production procedure may be carried out equally well when the yoke structure 28 is fastened to the element 11', and after the shoulders 13, 14 are rigidly affixed to the element the jigs 20 may be removed and used in assembling the next unit.

It has been found that a titanate element affixed in a channeled base structure, as described and illustrated herein, may provide a phonograph pickup transducer having suitable characteristic when there is no means other than the constricted zone 16, to which one end of the element is cemented, for providing substantial support for the element. The transducer structure provided in this way is a simple, inexpensive, and effective arrangement. It may be desirable in some cases, in order to eliminate resonant conditions or in order otherwise to modify the electrical and mechanical behavior of the device, to provide rather soft damping pads between the element 11 and the walls of the channel 17. These pads should be soft enough to serve for damping only and not for affording substantial support to the element. When such pads are used, however, they may aid in centering the element within the channel during the cementing operation. The element 11, disposed in the channel 17, is protected from mechanical shocks by the base structure surrounding the depressed region or channel.

In addition to the main elongated channel 17 the bottom of the base 12 is formed to provide individual tributary channels 21, 22 entering the main channel on each side thereof. A pair of connector prongs 23 and 24, affixed to one end of the base 12, extend thereinto to connect with the tributary channels 21 and 22 respectively. The base 12 is provided with the customary mounting holes 26, 27.

Mechanical means in the form of a yoke structure 28 is coupled to the element 11 at the other end portion thereof—that is, the end portion of the element remote from the end portion cemented to the shoulders 13, 14—for translating the mechanical energy associated with bending of the element during transducing. Referring especially to Figs. 3 and 4, the arrangement of the element 11 and the yoke structure 28 appears in greater detail. The yoke structure includes a yoke-shaped portion 29 slipped over and fastened by cement to the bottom of the unmounted end portion of the element 11. Welded to the yoke-shaped portion 29 of the yoke structure is a bent lug 31 the free end of which supports a stylus 32.

Between the yoke structure 28 and the mounted end portion of the element 11 electrode means are provided on the element for translating the electrical energy during transducing. The electrode means includes an inside electrode 34 and two outer electrodes 35, 36, the latter being individually adjacent the opposite sides 18, 19 of the element. As seen in Figs. 1 and 2, electrical lead conductors 37, 38 are laid individually in the tributary channels 21, 22 and connected individually to the two outer electrodes 35, 36, so that the wire 37 connects the electrode 35 to the prong 23 while the wire 38 connects the electrode 36 to the prong 24. These wires ordinarily are strung tightly enough to support themselves within the tributary channels, but may be cemented therein if desired.

A suitable element of the type illustrated in Figs. 3 and 4 may be formed of barium titanate material and may have over-all dimensions of about 0.75 inch long, 0.125 inch high, and 0.035 wide, with a substantially uniform wall thickness of the order of 0.01 inch, for example 0.008 to 0.012 inch. A method for making such an element is described and claimed in the copending application Serial No. 32,588, filed June 12, 1948, in the name of Charles K. Gravley and assigned to the same assignee as the present invention, which issued on May 22, 1951, as Patent No. 2,554,527. The barium titanate material may be polarized by the continuous application of polarizing voltage thereto, in the manner shown in the aforementioned copending application of Hans Jaffe, Serial No. 740,460. Permanent polarization of the material in a direction radially inward on both sides of the element or, if desired, radially outward on both sides, also may be effected by connecting the outer electrodes 35, 36 together temporarily and applying a voltage between them and the inside electrode 34 for an appreciable period of time. For an element of the dimensions given above a polarizing voltage of 500 to 700 volts may be used.

Describing briefly the operation of the transducer unit illustrated in Figs. 1–4, this unit may be used for transducing either from mechanical energy to electrical energy or from electrical to mechanical energy. In the latter case the unit might be used as a recording head for a phonographic recording device. However, the unit as described hereinabove is better adapted for use as a phonographic reproducing or play-back device. Its operation as a phonographic reproducer, therefore, will be described, and the converse operation of transducing in the reverse direction will be evident to those skilled in the art.

When operated as a pickup unit, the unit may be mounted on a conventional phonograph tone arm by passing mounting screws upward through the mounting holes 26 and 27. A cover plate, not shown, having holes aligned with the holes 26 and 27 and a notch where the yoke structure emerges from the base 12, may be held on the unit by the mounting screws. The unit so mounted is arranged for motion of the stylus 32 in directions laterally of the element 11, as indicated by the double arrow in Fig. 1. This results in a bending of the longitudinally extending portions of the element 11. Since one end portion of the element is rigidly cemented to the walls of the constricted zone 16, this bending is permitted to take place without substantial rotation of the dielectric material of that end portion of the element. Thus the element is mounted as a cantilever beam with one end firmly held in the constricted zone. Stresses applied to the other end cause bending strains throughout the length of the beam except at the end portion where it is noncompliantly held. This rigid mounting arrangement affords a stress amplitude and distribution in the material of the element itself and at the region of mounting different from the stresses obtained with relatively compliant mounting pads, and is one advantage of the transducer arrangement of the present invention.

The bending stresses cause contraction of one of the sides 35, 36 of the electro-mechanically sensitive element and simultaneous expansion of the other side of the element. This results in the development of electrical charges on the outer electrodes 35 and 36 of opposite polarity with respect to the inside electrode 34, assuming that the electro-mechanically sensitive material is polarized radially as described hereinabove. As measured around a circuit including the connector prongs 23 and 24, these electrical charges are additive and appear as signal voltages across the connectors, the voltages corresponding to the mechanical displacements of the stylus 32.

The bent lug 31 and the stylus 32 affixed thereto constitute a mechanical member extending in a direction outward of the depressed region or channel 17 and having substantial mechanical compliance in this outward direction and in the opposite inward direction by virtue of the bent configuration and thinness of the lug 31. It will be evident that any extraordinary mechanical shocks applied to the stylus in a direction inwardly of the channel are absorbed for the most part by the compliant lug 31 up to the point where the tip of the stylus 32 has reached the level of the bottom of the base 12. The base structure protects the mechanical coupling arrangement 28 and the element 11 coupled thereto from any farther extraordinary mechanical displacements in the direction inward of the channel.

Extraordinary mechanical shocks in a lateral direction, however, may strain the material of the element 11 to the breaking point, especially in view of the non-compliant mounting arrangement. To protect the dielectric material from breakage a unitary motion-limiting member is provided on the base structure 12 remote from the mounted end portion of the element and disposed in the direction of the bending displacements of the two relatively flat sides 18, 19 of the element at a distance therefrom such as effectively to limit such displacements thereof. More specifically, unitary motion-limiting members are provided in the form of wall members 41, 42 of the depressed region or channel 17, as shown in Fig. 1. These wall portions 41, 42 of the channel are disposed in the direction of bending of the flat sides 18 and 19 of the element 11 in the region where the yoke structure 28 is connected to the element for driving it mechanically, since this region remote from the mounted end portion of the element is the region of greatest displacement of the element due to the application of lateral forces to the stylus 32. The effectiveness of the wall portions 41, 42 in limiting lateral displacements of the element to protect it from breakage is determined, of course, by the amount of displacement which can occur before the element, or the yoke structure 28, reaches a wall of the channel and is prevented thereby from further displacement. This distance should be large enough to permit the usual bending displacements during operation but small enough to prevent bending displacements approaching the breaking point of the dielectric material. This distance depends on the configuration of the element, and is determined for a given element by the width of the channel 17 between its wall portions 41 and 42 and by the angular relationship of the sides 35, 36 of the mounted end portion of the element to the walls or shoulders 13, 14 of the constricted supporting zone 16. The shaping of the channel 17 in the base block 12 and the disposing of the element 11 within the channel 17 when the element is cemented to the base are carried out so as to provide the desired limitation of bending displacements.

It may be mentioned that it is possible to increase materially the mechanical strength of hollow elements such as the element 11 so as to make them more resistant to breakage during assembly or during operation. This may be done by filling the ends of a hollow element with a suitable material such as a thermosetting or casting resin. The raw resin may be liquefied by heating and sucked into the narrow end openings of the hollow tube by capillary action. In the transducer of Figs. 1–4, the resin may fill the end portion of the hollow element 11 which is to be placed within the supporting zone 16 and the end portion beneath the yoke structure 28.

Figs. 6 and 7 are front and bottom views respectively of a phonograph pickup arrangement embodying one feature of the present invention. This pickup comprises the elongated electroded element 11 having the yoke structure 28 with the stylus 32, just as in the arrangement of Figs. 1–4. The pickup also includes a tone arm 44, preferably of nonconductive material. This arm may be a single piece of plastic material such as polystyrene or polymethyl methacrylate, and may be formed conveniently by a molding operation carried out at a temperature at which the resin is plastic. One end portion of the arm is adapted for attachment to a pivotal mounting device, illustrated schematically at 46 in Figs. 6 and 7. This mounting device may be of any of several well known types, and includes a vertical shaft 47 about which the arm may rotate and an additional conventional pivot arrangement, not shown, permitting the unmounted end of the arm to be lifted. The arm 44 is adapted for insertion into a similarly shaped hole in one side of the mounting device 46, and may be held therein by friction and by a set screw 48.

The other end portion of the arm 44 is tapered into a wider and thinner unitary structure forming a unitary holder for the element 11, an element of polycrystalline dielectric material being preferred for use in this pickup. As seen in the bottom view of Fig. 7, this holder portion 49 of the arm has, shaped in the nonconductive plastic material of the arm, a main channel 51 for receiving the element and two tributary channels 52, 53 carrying the lead wires 37', 38' connected to the outer electrodes of the element.

The lead wires 37', 38' pass through the arm 44 in a shielded cable 54, supported inside the arm, which is U-shaped in cross section, by bowed supports 56 of spring metal. Fig. 8 is a cross-sectional view of the U-shaped arm 44, showing the cable 54 and a support 56 as well as the entrance openings of the tributary channels 52 and 53 in the holder portion of the arm.

In operation the pickup arrangement of Figs. 6–8 functions in the same manner as is described above in connection with the transducer of Figs. 1–4. The stylus 32 may track in the spiral groove of a record disk. The mechanical signals present in the record as lateral displacements of the walls of the spiral groove impart corresponding lateral motions to the stylus 32 during rotation of the record disk, resulting in bending displacements of the electro-mechanically sensitive element 11. Electrical signals, corresponding to the mechanical signals generated by the record disk, are conducted by the lead wires 37', 38' through the cable 54 and leave the tone arm underneath the mounting device 46, whence the lead wires are coupled to the input circuit of a reproducing or modulating device, not shown, of any conventional type.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electro-mechanical transducer comprising, an elongated element of electro-mechanically sensitive polycrystalline dielectric material and which has an electro-mechanical response involving a bending of longitudinally extending portions of said element during transducing therein between the mechanical energy associated with said bending and electrical energy, a base block having, for receiving said longitudinally extending portions of said element, an elongated depressed region including a constricted supporting zone with walls adjacent and rigidly affixed to two opposite sides of one end portion of said elongated element, said element being disposed in spaced relationship to said depressed region of said base block except at said one end portion, mechanical means coupled to said element at the other end portion thereof for translating said mechanical energy, electrode means on said element for translating said electrical energy, and motion-limiting wall members of said depressed region on said base block, remote from said one end portion of said element and disposed in the direction of said bending thereof at a distance therefrom such as effectively to limit displacements thereof to protect said polycrystalline dielectric material from breakage.

2. An electro-mechanical transducer comprising, an elongated element of electro-mechanically sensitive polycrystalline titanate material and which has an electro-mechanical response involving a bending of longitudinally extending portions of said element during transducing therein between the mechanical energy associated with said bending and electrical energy, a base block having, for receiving said longitudinally extending portions of said element, an elongated depressed region including a constricted supporting zone with walls adjacent and rigidly affixed to two opposite sides of one end portion of said elongated element, said element being disposed in spaced relationship to said depressed region of said base block except at said one end portion, mechanical means coupled to said element at the other end portion thereof for translating said mechanical energy, electrode means on said element for translating said electrical energy, and motion-limiting wall members of said depressed region on said base block, remote from said one end portion of said element and disposed in the direction of said bending thereof at a distance therefrom such as effectively to limit displacements thereof to protect said polycrystalline titanate material from breakage.

3. An electro-mechanical transducer comprising, an elongated element of polycrystalline barium titanate material and which has an electro-mechanical response involving a bending of longitudinally extending portions of said element during transducing therein between the mechanical energy associated with said bending and electrical energy, a base block having, for receiving said longitudinally extending portions of said element, an elongated depressed region including a constricted supporting zone with walls adjacent and rigidly affixed to two opposite sides of one end portion of said elongated element, said element being disposed in spaced relationship to said depressed region of said base block except at said one end portion, mechanical means coupled to said element at the other end portion thereof for translating said mechanical energy, electrode means on said element for translating said electrical energy, and motion-limiting wall members of said depressed region on said base block, remote from said one end portion of said element and disposed in the direction of said bending thereof at a distance therefrom such as effectively to limit displacements thereof to protect said polycrystalline titanate material from breakage.

4. An electro-mechanical transducer comprising, an elongated element of thin-walled electro-mechanically sensitive polycrystalline titanate material with material thickness of the order of one hundredth of an inch with resulting fragility and which has an electro-mechanical response involving a bending of longitudinally extending portions of said element during transducing therein between the mechanical energy associated with said bending and electrical energy, a base block having, for receiving said longitudinally extending portions of said element, an elongated depressed region including a constricted supporting zone with walls adjacent and rigidly affixed to two opposite sides of one end portion of said elongated element, said element being disposed in spaced relationship to said depressed region of said base block except at said one end portion, mechanical means coupled to said element at the other end portion thereof for translating said mechanical energy, electrode means on said element for translating said electrical energy, and motion-limiting wall members of said depressed region of said base block, remote from said one end portion of said element and disposed in the direction of said bending thereof at a distance therefrom such as effectively to limit displacements thereof to protect said fragile thin-walled titanate material from breakage.

5. An electro-mechanical transducer comprising, an elongated hollow element of electro-mechanically sensitive polycrystalline dielectric material and which has an electro-mechanical response involving a bending of longitudinally extending portions of said element during transducing therein between the mechanical energy associated with said bending and electrical energy, a base block having, for receiving said longitudinally extending portions of said element, an elongated depressed region including a constricted supporting zone with walls adjacent and rigidly affixed to two opposite sides of one end portion of said elongated hollow element, said element being disposed in spaced relationship to said depressed region of said base block except at said one end portion, mechanical means coupled to said element at the other end portion thereof for translating said mechanical energy, electrode means on said element for translating said electrical energy, and motion-limiting wall members of said depressed region of said base block, remote from said one end portion of said element and disposed in the direction of said bending thereof at a distance therefrom such as effectively to limit displacements thereof to protect said dielectric material from breakage.

6. An electro-mechanical transducer comprising: an elongated hollow element, generally elliptical in cross section, of electro-mechanically sensitive polycrystalline material, and which has an electro-mechanical response involving a bending of longitudinally extending portions of said element during transducing therein between the mechanical energy associated with said bending and electrical energy; a base block having, for receiving said longitudinally extending portions of said element, an elongated depressed region including a constricted supporting zone with walls adjacent and rigidly affixed to the two relatively flat sides of one end portion of said elongated hollow element, said element being disposed in spaced relationship to said depressed region of said base block except at said one end portion; mechanical means coupled to said element at the other end portion thereof for translating said mechanical energy; electrode means on said element for translating said electrical energy; and motion-limiting wall members of said depressed region of said base block, disposed in the direction of the bending displacements of the two relatively flat sides of said element remote from said one end portion thereof at a distance therefrom such as effectively to limit said displacements to protect said dielectric material from breakage.

7. An electro-mechanical transducer comprising: an elongated element of electro-mechanically sensitive dielectric material and which has an electro-mechanical response involving a bending of longitudinally extending portions of said element during transducing therein between the mechanical energy associated with said bending and electrical energy; a base block having, for receiving said longitudinally extending portions of said element, an elongated depressed region including a constricted supporting zone with walls adjacent and rigidly affixed to two opposite sides of one end portion of said elongated element, said element being disposed in spaced relationship to said depressed region of said base block except at said one end portion; mechanical means coupled to said element at the other end portion thereof for translating said mechanical energy; electrode means on said element for translating said electrical energy; and motion-limiting wall members of said depressed region of said base block, remote from said one end portion of said element and disposed in the direction of said bending thereof at a distance therefrom such as effectively to limit displacements thereof to protect said dielectric material from breakage.

8. An electro-mechanical transducer comprising: an elongated element of electro-mechanically sensitive dielectric material and which has an electro-mechanical response involving a bending of longitudinally extending portions of said element during transducing therein between the mechanical energy associated with said bending and electrical energy; a base block of nonconductive material having, for receiving said longitudinally extending portions of said element, an elongated depressed region including a constricted supporting zone with walls adjacent and rigidly cemented by areas of the same nonconductive material to two opposite sides of one end portion of said elongated element, said element being disposed in spaced relationship to said depressed region of said base block except at said one end portion; mechanical means coupled to said element at the other end portion thereof for translating said mechanical energy; electrode means on said element for translating said electrical energy; and motion-limiting wall members of said depressed region of said base block, remote from said one end portion of said element and disposed in the direction of said bending thereof at a distance therefrom such as effectively to limit displacements thereof to protect said dielectric material from breakage.

9. An electro-mechanical transducer comprising: an elongated element of electro-mechanically sensitive dielectric material and which has an electro-mechanical response involving a bending of longitudinally extending portions of said element during transducing therein between the mechanical energy associated with said bending and electrical energy; a base block having, for receiving said longitudinally extending portions of said element, an elongated depressed region including a constricted supporting zone with walls adjacent and rigidly cemented to two opposite sides of one end portion of said elongated element to permit said bending without substantial rotation of the dielectric material of said one end portion, said element being disposed in spaced relationship to said depressed region of said base block except at said one end portion; mechanical means coupled to said element at the other end portion thereof and extending outwardly of said depressed region for translating said mechanical energy; electrode means on said element for translating said electrical energy; and motion-limiting wall members of said depressed region of said base block, remote from said one end portion of said element and disposed in the direction of said bending thereof at a distance therefrom such as effectively to limit displacements thereof to protect said dielectric material from breakage due to mechanical shocks applied to said mechanical means in said direction of bending.

10. An electro-mechanical transducer comprising: an elongated element of electro-mechanically sensitive dielectric material and which has an electro-mechanical response involving a bending of longitudinally extending portions of said element during transducing therein between the mechanical energy associated with said bending and electrical energy; a base block having, for receiving said longitudinally extending portions of said element, an elongated depressed region including a constricted supporting zone with walls adjacent and rigidly affixed to opposite sides of one end portion of said elongated element, said element being disposed in spaced relationship to said depressed region of said base block except at said one end portion with no means other than said constricted zone for providing substantial support for said element; mechanical means coupled to said element at the other end portion thereof for translating said mechanical energy; electrode means on said element for translating said electrical energy; and motion-limiting wall members of said depressed region of said base block, remote from said one end portion of said element and disposed in the direction of said bending thereof at a distance therefrom such as effectively to limit displacements thereof to protect said dielectric material from breakage.

11. An electro-mechanical transducer comprising: an elongated element of electro-mechanically sensitive polycrystalline dielectric material and which has an electro-mechanical response involving a bending of longitudinally extending portions of said element during transducing therein between the mechanical energy associated with said bending and electrical energy; a base block having, for receiving said longitudinally extending portions of said element, an elongated depressed region including a constricted supporting zone with walls adjacent and rigidly affixed to two opposite sides of one end portion of said elongated element, said element being disposed within said depressed region in spaced relationship thereto except at said one end portion and being protected from direct mechanical shocks by said base structure in which said depressed region is formed; mechanical means coupled to said element at the other end portion thereof for translating said mechanical energy, including a member extending in a direction outward of said depressed region and having substantial mechanical compliance in said outward direction and in the opposite inward direction, said mechanical means and said element coupled thereto being protected by said compliance and by said base block from mechanical shocks applied to said mechanical member in said inward direction; electrode means on said element for translating said electrical energy; and motion-limiting wall members of said depressed region of said base block, remote from said one end portion of said element and disposed in the direction of said bending thereof at a distance therefrom such as effectively to limit lateral displacements thereof to protect said dielectric material from breakage due to lateral mechanical shocks applied to said mechanical member.

12. An electro-mechanical transducer comprising: an elongated element of electro-mechanically sensitive dielectric material and which has an electro-mechanical response involving a bending of longitudinally extending portions of said element during transducing therein between the mechanical energy associated with said bending and electrical energy; a base block having, for receiving said longitudinally extending portions of said element, a channel including a constricted supporting zone with walls adjacent and rigidly affixed to two opposite sides of one end portion of said elongated element, said element being disposed in spaced relationship to the walls of said channel except at said one end portion; mechanical means coupled to said element at the other end portion thereof and extending outwardly of said channel for translating said mechanical energy; electrode means on said element for translating said electrical energy; and wall portions of said channel remote from said one end portion of said element and disposed in the direction of said bending thereof at a distance therefrom such as effectively to limit displacements thereof to protect said dielectric material from breakage.

13. An electro-mechanical transducer comprising: an elongated element of electro-mechanically sensitive dielectric, material, having a longitudinal configuration conforming to a predetermined configuration within fixed tolerances, and which has an electro-mechanical response involving a bending of longitudinally extending portions of said element during transducing therein between the mechanical energy associated with said bending and electrical energy; a base block having, for receiving said longitudinally extending portions of said element, a channel including a constricted supporting zone with walls adjacent and rigidly affixed to two opposite sides of one end portion of said elongated element, said supporting zone being wider than said one end portion so as to have sufficient width to accommodate therewithin said one end portion of said element with said sides of said one end portion aligned approximately contiguous to said walls of said supporting zone but with an angular relationship thereto such that said element not only is disposed in spaced relationship to the walls of said channel except at said one end portion but also is centered approximately in said channel in spite of any differences within said fixed tolerances from said predetermined configuration; mechanical means coupled to said element at the other end portion thereof and extending outwardly of said channel for translating said mechanical energy; electrode means on said element for translating said electrical energy; and wall portions of said channel remote from said one end portion of said element and disposed in the direction of said bending thereof at a distance therefrom, determined by the location of said wall portions and by said angular relationship, such as effectively to limit displacements of said element to protect said dielectric material from breakage.

14. An electro-mechanical transducer comprising: an elongated element of electro-mechanically sensitive dielectric material and which has an electro-mechanical response involving a bending of longitudinally extending portions of said element during transducing therein between the mechanical energy associated with said bending and electrical energy; a base block of nonconductive material having, for receiving said longitudinally extending portions of said element, a main channel including a constricted supporting zone with walls adjacent and rigidly affixed to two opposite sides of one end portion of said elongated element and having individual tributary channels entering said main channel on each side thereof, said element being disposed in spaced relationship to the walls of said main channel except at said one end portion; mechanical means coupled to said element at the other end portion thereof and extending outwardly of said main channel for translating said mechanical energy; electrode means on said element for translating said electrical energy, including two electrodes individually adjacent opposite sides of said element; electrical lead conductors laid individually in said tributary channels and connected individually to said two electrodes; and wall portions of said main channel remote from said one end portion of said element and disposed in the direction of said bending thereof at a distance therefrom such as effectively to limit displacements thereof to protect said dielectric material from breakage.

15. A phonograph pickup comprising: an elongated element of electro-mechanically sensitive dielectric material and which has an electro-mechanical response involving a bending of longitudinally extending portions of said element during transducing therein between the mechanical energy associated with said bending and electrical energy; a tone arm of a shapable material one end portion of which is arranged for pivotal mounting and the other end portion of which has, shaped in said material for receiving said longitudinally extending portions of said element, an elongated depressed region including a constricted supporting zone with walls adjacent and rigidly affixed to two opposite sides of one end portion of said elongated element, said element being disposed in spaced relationship to said depressed region except at said one end portion of said element; mechanical means coupled to said element at the other end portion thereof and extending outwardly of said depressed region for translating said mechanical energy; and electrode means on said element for translating said electrical energy.

16. A phonograph pickup comprising: an elongated element of electro-mechanically sensitive polycrystalline dielectric material and which has an electro-mechanical response involving a bending of longitudinally extending portions of said element during transducing therein between the mechanical energy associated with said bending and electrical energy; a tone arm of nonconductive material one end portion of which is arranged for pivotal mounting and the other end portion of which has in said non-conductive material, for receiving said longitudinally extending portions of said element, an elongated depressed region including a constricted supporting zone with walls adjacent and rigidly affixed to two opposite sides of one end portion of said elongated element, said element being disposed in spaced relationship to said depressed region except at said one end portion of said element; mechanical means coupled to said element at the other end portion thereof and extending outwardly of said depressed region for translating said mechanical energy; electrode means on said element for translating said electrical energy; and motion-limiting wall members of said depressed region, remote from said one end portion of said element and disposed in the direction of said bending thereof at a distance therefrom such as effectively to limit displacements thereof to protect said dielectric material from breakage.

THOMAS E. LYNCH.

REFERENCES CITED

The following references are of record in the file of this patent:

UNITED STATES PATENTS

| Number | Name | Date |
|---|---|---|
| 1,438,974 | Wente | Dec. 19, 1922 |
| 2,020,212 | Quam | Nov. 5, 1935 |
| 2,352,311 | Di Toro | June 27, 1944 |
| 2,363,497 | Begun | Nov. 28, 1944 |
| 2,396,283 | Papst | Mar. 12, 1946 |
| 2,402,515 | Wainer | June 18, 1946 |
| 2,453,297 | Benson | Nov. 9, 1948 |
| 2,486,560 | Gray | Nov. 1, 1949 |
| 2,497,108 | Williams | Feb. 14, 1950 |

FOREIGN PATENTS

| Number | Country | Date |
|---|---|---|
| 728,644 | France | July 8, 1932 |
| 849,531 | France | Nov. 25, 1939 |